No. 668,834. Patented Feb. 26, 1901.
W. HAAKER & R. F. MULLINS.
PROCESS OF MANUFACTURING TIN BOXES FOR FOOD PRODUCTS.
(Application filed Dec. 7, 1899. Renewed Aug. 1, 1900.)
(No Model.)

Witnesses.
Robert Everett.

Inventors.
William Haaker.
Robert Fulton Mullins,
By
James L. Norris.
Atty.

UNITED STATES PATENT OFFICE.

WILLIAM HAAKER, OF VERONA, NEW JERSEY, AND ROBERT FULTON MULLINS, OF BROOKLYN, NEW YORK.

PROCESS OF MANUFACTURING TIN BOXES FOR FOOD PRODUCTS.

SPECIFICATION forming part of Letters Patent No. 668,834, dated February 26, 1901.

Application filed December 7, 1899. Renewed August 1, 1900. Serial No. 25,588. (No specimens.)

*To all whom it may concern:*

Be it known that we, WILLIAM HAAKER, residing at Verona, county of Essex, State of New Jersey, and ROBERT FULTON MULLINS, residing at Brooklyn, Kings county, State of New York, citizens of the United States, have invented new and useful Improvements in the Manufacture of Decorated Boxes or Tins for Food Products, of which the following is a specification.

This invention relates to that class or type of tins or boxes, receptacles, or vessels composed of tin or other sheet metal useful for many purposes, but particularly designed for packing sardines and other food products and wherein the surface of the metal composing the box body and lid is decorated with designs, figures, or patterns in any desired color or colors.

The chief object of our invention is to provide a novel, simple, effective, and economical method or process of manufacturing tins or boxes, receptacles, or vessels of the character referred to without the employment of solder and which are externally decorated by any desired pattern in variegated colors, whereby the decoration will not be damaged or break or peel off either in drawing the metal into box form or cooking the box after the sardines or other food or perishable products are placed therein for preservation by cooking and hermetical sealing. This object is accomplished in the manner and by the means hereinafter described and claimed, reference being made to the accompanying drawings, in which—

Figure 1:
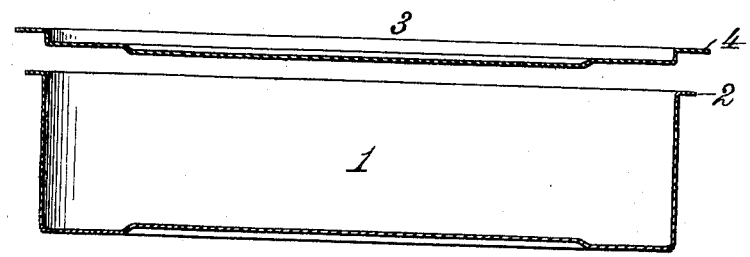
Figure 2:
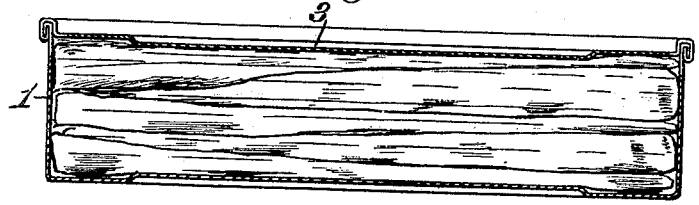

Figure 1 is a sectional view of a box prior to the margin of the cover or lid being folded or spun into connection with a flange on the edge of the box-body, and Fig. 2 is a similar view showing the completed box hermetically sealed and containing the food or other perishable articles.

In the manufacture of tins or sheet-metal boxes, receptacles, or vessels designed for packing sardines and other perishable food products the metal is first decorated, then subjected to a comparatively high temperature to bake it, and then drawn or pressed into shape to produce the box-body and the cover or lid. The baking of the decorated metal at high temperature prior to drawing or pressing it into box bodies and covers or lids is seriously objectionable in that the decoration breaks or peels off or is otherwise damaged, particularly at the corners, when the metal is drawn or pressed into shape, and particularly when the boxes are cooked with the contents therein that are to be preserved. We have discovered that this objectionable breaking or peeling off of the decoration is entirely avoided by first subjecting the metal to a moderate temperature to bake it and leave the decorations comparatively elastic and then drawing or shaping the box-body and cover or lid into the required form and subjecting them to a comparatively high baking temperature to thoroughly dry and harden the decorated surfaces, whereby the subsequent cooking of the box to cook the sardines or other food products will not cause the decorations to break or peel, as heretofore.

In carrying our invention into effect for the manufacture of tins or sheet-metal boxes, receptacles, or vessels having decorated surfaces in variegated colors and designed to contain sardines or other food products which require to be cooked we decorate the surface of the metal in any desired or ordinary manner and provide the desired design or pattern in any color or colors and then subject the same to a light baking process at a temperature of about 160° Fahrenheit, which leaves the decoration comparatively elastic. The metal is then drawn or pressed in the required shape to produce the box-bodies and the covers or lids, and after this has been accomplished the box-bodies and covers or lids are subjected to a secondary baking process at a temperature from about 250° to 300° Fahrenheit, whereby the decorations are thoroughly dried and hardened, and consequently when the sardines or other food products are placed in the boxes and the latter are sealed and subjected to the cooking process the decorations will not boil, break, or peel off, but remain firm, fixed, and substantial throughout. The first or preliminary baking step being comparatively light, or rather at a comparatively low temperature, the decorations are left somewhat elastic, as before stated, and in a measure can stretch in such manner that the metal can be properly drawn, pressed, or shaped into the box-bodies and covers or lids without danger or liability of the decorations breaking or peeling off, particularly at the corner portions, during the drawing or shaping process. The secondary baking step perfectly dries and hardens the decorations in such manner that during the cooking process the decorations will not boil off, as before mentioned. The preliminary and secondary baking processes or steps render the decorations susceptible of successfully withstanding the subsequent necessary cooking process without danger or liability of damaging the colored decorations, and this is the important advantage of our invention.

In packing sardines and other food products of any nature whatever where a decorated metal box, receptacle, tin, or vessel is required and where the contents are necessarily cooked by boiling in water or through the medium of steam or other heat our improved process of manufacturing the box and preparing it for the cooking process or step effectually preserves the decorations intact and entirely avoids the previous serious objection that the decorations break or peel off in the drawing or shaping process and in the cooking step, all of which we avoid.

After the box is manufactured, as hereinbefore described, and the sardines or other food products are placed therein the cover or lid is secured in the following manner: The edge of the mouth of the box-body 1 is formed with a laterally-projecting flange 2, extending continuously around the same, and the cover or lid 3 is shaped to fit down into the inside of the box, and its marginal rim 4 is folded or spun around and into engagement with the flange, the said margin of the cover or lid and the said flange being crimped together in any suitable manner to produce a symmetrical and nicely-finished article, which is hermetically closed or sealed.

The decoration of the box-body may be merely an enameled surface, and the top surface of the cover or lid may be decorated by enameling and by various designs or patterns in variegated colors. The decorations of the box-body and the cover or lid may be widely varied to suit the conditions required or whatever may be desired to produce a handsome and ornamental article.

Having thus described our invention, what we claim is—

1. The method or process herein described of manufacturing receptacles for food products, which consists in decorating sheet metal with any desired pattern and color, subjecting the same to a moderate preliminary baking step to leave the decorated surface comparatively elastic, then drawing or shaping the sheet metal into box form, and then subjecting the box to a secondary baking process at a higher temperature to dry and harden the decoration and render it susceptible of successfully withstanding the subsequent cooking step in the packing of the food products, substantially as set forth.

2. The method or process herein described of manufacturing sheet-metal boxes for packing food products, which consists in decorating the surface of sheet metal with any desired color, subjecting the same to a preliminary baking step, leaving the decorated surface comparatively elastic, then shaping the decorated sheet metal into a box, and then subjecting this box to a secondary baking step at a temperature between 250° and 300° Fahrenheit, substantially as and for the purposes set forth.

In testimony whereof we have hereunto set our hands in presence of two subscribing witnesses.

WILLIAM HAAKER.
ROBERT FULTON MULLINS.

Witnesses:
EDW. NILSON,
WM. GAYNOR.